United States Patent
Pinker

(10) Patent No.: US 6,415,598 B2
(45) Date of Patent: Jul. 9, 2002

(54) EXHAUST NOZZLE FOR BY-PASS GAS TURBINE ENGINES

(75) Inventor: Richard A Pinker, Farnborough (GB)

(73) Assignee: Qinetiq Limited, London (GB)

( * ) Notice: Subject to any disclaimer, the term of this patent is extended or adjusted under 35 U.S.C. 154(b) by 37 days.

(21) Appl. No.: 09/725,948

(22) Filed: Nov. 30, 2000

(30) Foreign Application Priority Data

Dec. 1, 1999 (GB) .............................................. 9928349

(51) Int. Cl.$^7$ ................................................. F02K 3/02
(52) U.S. Cl. ........................... 60/226.1; 60/262; 60/39.5
(58) Field of Search .............................. 60/39.5, 226.1, 60/262, 770; 239/265.11; 181/213, 220

(56) References Cited

U.S. PATENT DOCUMENTS

| | | | |
|---|---|---|---|
| 4,280,587 A | * | 7/1981 | Bhat .......................... 181/213 |
| 4,288,984 A | * | 9/1981 | Bhat et al. .................. 60/226.1 |
| 5,924,632 A | * | 7/1999 | Seiner et al. ........... 239/265.19 |
| 6,314,721 B1 | * | 11/2001 | Mathews et al. .............. 60/264 |

* cited by examiner

Primary Examiner—Charles G. Freay
(74) Attorney, Agent, or Firm—Nixon & Vanderhye P.C.

(57) ABSTRACT

A by-pass gas turbine engine including a primary and a secondary nozzle which are substantially convergent, wherein the primary nozzle is situated radially within, but axially protruding from, the secondary nozzle characterised in that the primary and secondary nozzles have a substantially common central axis along their lengths and the direction of airflow exiting at least one of the primary or secondary nozzles is at an angle to the central axis of the engine and that the direction of airflow exiting each nozzle is at an angle to the other thereby promoting preferential distribution and mixing of the airflows. The end of both the primary and secondary nozzles may be truncated at oppositely orientated oblique angles. The internal profile of one or both nozzles may be arranged such that the airflow leaves the that nozzle at an angle to the axis of the nozzle.

4 Claims, 1 Drawing Sheet

EXHAUST NOZZLE FOR BY-PASS GAS TURBINE ENGINES

The invention relates to arrangement of the propulsion nozzles for gas turbine engines in particular to by-pass gas turbine engines.

Control of the mixing and distribution of the exhaust jet plumes can be used to reduce the noise from gas turbine engines. Several methods have been tried to effect this and have resulted in differing degrees of effectiveness. Most methods result in significant thrust losses or increased weight.

U.S. Pat. No. 4.288,984 discloses a number of ways in which the mixing and distribution of the exhaust jet plumes is controlled in a by-pass engine. These include having a swept, canted or off-set primary nozzle.

It is an object of the invention to provide an improved nozzle design for by-pass engines which offers a significant reduction in noise while maintaining high efficiency.

The invention comprises a by-pass gas turbine engine including a primary and a secondary nozzle wherein the primary nozzle is situated radially within, but axially protruding from, the secondary nozzle characterised in that the primary and secondary nozzles have a substantially common central axis along their lengths and that the direction of airflow exiting at least one of the primary or secondary nozzles is at an angle to the central axis of the engine and the direction of airflow exiting each nozzle is at an angle to the other thereby promoting preferential distribution and mixing of the airflows.

This promotes mixing and dilution of the airflow and shielding the higher velocity jet by a greater proportion of the bypass flow, causing the noise to be convected to angles closer to the engine axis.

In one embodiment of the invention both the primary and secondary nozzles are truncated at oblique angles. The nozzles are preferably orientated such that said oblique angles are opposite directions. The exit plane of the airflow is therefore not perpendicular to the central axis defined by the nozzle.

In an alternative embodiment the flow direction of the primary nozzle axis is simply orientated at a small angle to the axis of the secondary nozzle.

In a further embodiment of the invention the internal profile of one or both nozzles is asymmetric such that the primary flow exits the nozzle at an angle to the secondary flow.

By way of example, the invention will now be described with reference to the drawings of which:

Figure 1:
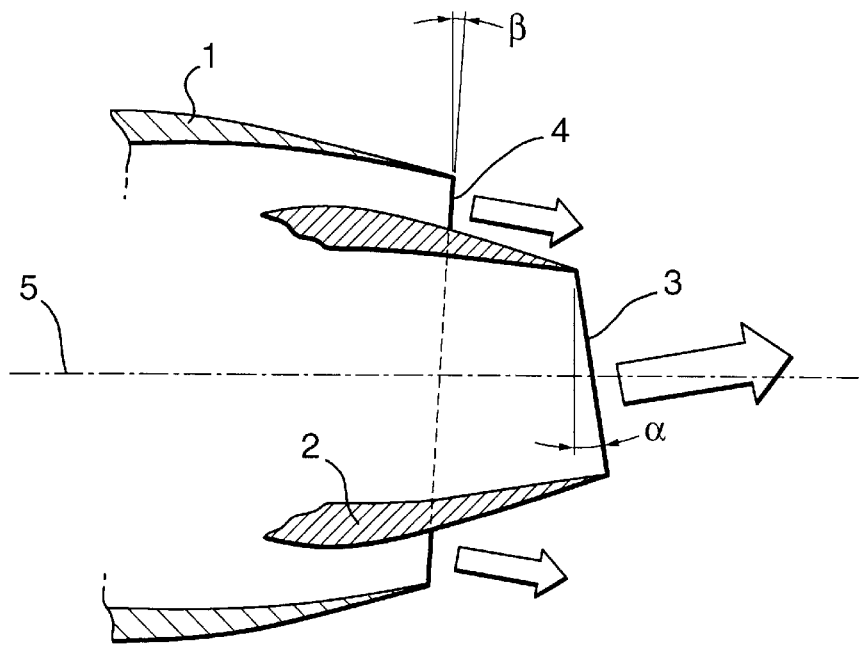
FIG. 1 shows a scarfed nozzle arrangement according to one aspect of the invention.

FIG. 1 shows an arrangement of primary and secondary nozzles, denoted 1 and 2 respectively, of a by-pass gas turbine engine. Both of these nozzle have oblique "Cut-off ends" 3, 4 i.e. they are truncated at angles of $\alpha$ and $\beta$ relative to the perpendicular of the longitudinal axis of the nozzles—the common central axis 5. The direction of the cut-offs are opposite with respect to the central axis 5. In the example, the oblique cut-off edge in elevation of the primary nozzle faces upwards and the oblique cut-off end of the secondary nozzle faces downwards. The angles $\alpha$ and $\beta$ lie in the range 0.5° to 30°.

In operation the general direction of air flow from the primary nozzle is in the direction of the long arrows and the short arrow indicates the general direction of air flow from the secondary nozzle. The quantities and direction of airflows is such that the overall momentum of airflow in an axis perpendicular to the engine axis is zero; i.e. the non axial airflows from the primary and secondary nozzles cancel each other.

Figure 2:
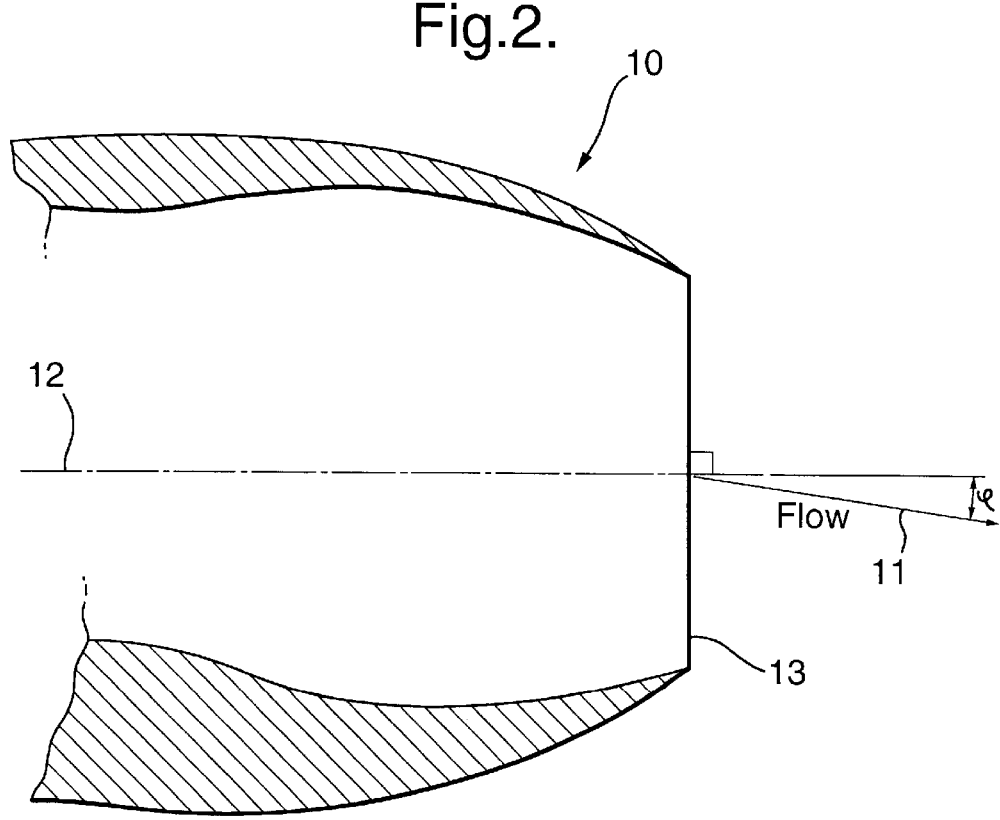
FIG. 2 shows a schematic cross-section of a nozzle according to the invention.

FIG. 2 shows a schematic cross-section of a nozzle 10 according to the invention. The nozzle 10 may be incorporated as either or both of the primary or secondary nozzles. The shape and geometry of the nozzle wall is such that the general or average direction of overall air flow 11 is at an angle $\psi$ to the central nozzle axis 12, when the central nozzle axis 12 is taken to be perpendicular to the end face 13 of the nozzle.

What is claimed is:

1. A by-pass gas turbine engine including a primary and a secondary nozzle wherein the primary nozzle is situated radially within, but axially protruding from, the secondary nozzle characterised in that the primary and secondary nozzles have a substantially common central axis along their lengths and the direction of airflow exiting at least one of the primary or secondary nozzles is at an angle to the central axis of the engine and that the direction of airflow exiting each nozzle is at an angle to the other thereby promoting preferential distribution and mixing of the airflows.

2. An engine as claimed in claim 1 wherein the end of both the primary and secondary nozzles are truncated at oblique angles and oriented such that said oblique angles are oppositely orientated.

3. An engine as claimed in claim 2 wherein said oblique angle is in the range 0.5° to 30°.

4. An engine as claimed in claim 1 wherein the internal profile of one or both nozzles is arranged such that the airflow leaves the nozzle at an angle to the axis of the nozzle said, axis taken to be perpendicular to end face of the nozzle.

* * * * *